US012258742B2

(12) United States Patent
Ren et al.

(10) Patent No.: US 12,258,742 B2
(45) Date of Patent: Mar. 25, 2025

(54) LIQUID DISPENSER SENSING DISTANCE SELF-LEARNING METHOD, AN ELECTRONIC DEVICE, AND A STORAGE MEDIUM

(71) Applicant: Shanghai Kohler Electronics, Ltd., Shanghai (CN)

(72) Inventors: Wenjie Ren, Shanghai (CN); Fei Shen, Shanghai (CN)

(73) Assignee: Shanghai Kohler Electronics, Ltd., Shanghai (CN)

( * ) Notice: Subject to any disclaimer, the term of this patent is extended or adjusted under 35 U.S.C. 154(b) by 41 days.

(21) Appl. No.: 18/244,030

(22) Filed: Sep. 8, 2023

(65) Prior Publication Data

US 2024/0084567 A1 Mar. 14, 2024

(30) Foreign Application Priority Data

Sep. 13, 2022 (CN) ........................ 202211107528.X

(51) Int. Cl.

*G08B 25/00* (2006.01)
*A47K 5/12* (2006.01)
*E03C 1/05* (2006.01)
*G08B 5/36* (2006.01)
*G08B 21/18* (2006.01)

(52) U.S. Cl.

CPC ............ *E03C 1/057* (2013.01); *A47K 5/1217* (2013.01); *G08B 5/36* (2013.01); *G08B 21/18* (2013.01)

(58) Field of Classification Search

USPC ........... 340/686.1, 686.6, 691.2, 3.7, 825.23, 340/5.32, 7.51, 286.08, 815.48, 815.79, 340/393.3

See application file for complete search history.

(56) References Cited

U.S. PATENT DOCUMENTS

| | | | | |
|---|---|---|---|---|
| 11,238,721 | B2 * | 2/2022 | Waghode | G08B 21/245 |
| 2004/0149003 | A1 * | 8/2004 | Nestvall | G01F 25/0084 73/1.73 |
| 2015/0315008 | A1 * | 11/2015 | Locke | G07F 13/00 222/52 |
| 2018/0147718 | A1 * | 5/2018 | Oleynik | G05B 19/42 |
| 2019/0357520 | A1 * | 11/2019 | Redden | G05B 17/02 |
| 2022/0096951 | A1 * | 3/2022 | Duffy | G09F 27/005 |

* cited by examiner

*Primary Examiner* — Daniel Previl
(74) *Attorney, Agent, or Firm* — Lempia Summerfield Katz LLC

(57) ABSTRACT

A liquid dispenser sensing distance self-learning method includes in response to a self-learning request, entering a self-learning mode. The method also includes, in the self-learning mode, determining a shortest distance between a reference object and a sensing component; determining and storing a sensing distance based on the shortest distance; and identifying, by a first indication device, a state of the self-learning mode. The method also includes, in response to a sensing request, entering a sensing mode; obtaining a detected distance between the reference object and the sensing component; comparing the detected distance with the sensing distance; and identifying, by a second indication device, a comparison result of the detected distance and the sensing distance.

20 Claims, 7 Drawing Sheets

LIQUID DISPENSER SENSING DISTANCE SELF-LEARNING METHOD, AN ELECTRONIC DEVICE, AND A STORAGE MEDIUM

CROSS REFERENCE TO RELATED APPLICATION

This application claims the benefit of priority to: Chinese Patent Application No. 202211107528.X filed in the Chinese Intellectual Property Office on Sep. 13, 2022, which is hereby incorporated by reference in its entirety.

FIELD

The present disclosure relates to the technical field of sanitary device, and particularly relates to a liquid dispenser sensing distance self-learning method, an electronic device, and a storage medium.

BACKGROUND

Currently, the installation methods of a liquid dispenser, such as a soap dispenser, a water dispenser, and other products, tend to be diversified. A counter basin that needs to be matched with the liquid dispenser tends to be complicated, and thus the difficulty of on-site debugging for the installer and maintenance personnel is increased.

The liquid dispenser on the current market basically has a simple liquid dispensing function and may not be adapted for the complex installation environment, and the sensing distance may only be manually adjusted several times or adjusted in blind way.

The existing liquid dispenser are more often used for in-wall applications. This type of the liquid dispenser has a sensing distance set inside a program. Some liquid dispensers lack learning function. Some liquid dispensers have a simple learning function and need to place a board to sense the distance from the sensor to the board as the actual sensing distance, without any reporting mechanism after learning. This brings the following four points of inconvenience:

1. If the liquid dispenser without learning function and having a sensing distance set internally needs to be installed on a countertop, the installer and the maintenance personnel need to rely on experience to determine the installation position of the liquid dispenser and even need to keep adjusting the position to meet the sensing distance of the liquid dispenser.
2. After the installation of the liquid dispenser, because neither the successful installation result nor the unsuccessful installation result is reported and the current learning value of the sensing distance is not reported, if the installation is not suitable, or there is a critical sensing area nearby, the installer is not able to notice the unsuitable installation. Thus, the risk of abnormal liquid discharge from the liquid dispenser is greatly increased.
3. The solution that the board is used to set the sensing distance and the distance from the sensor to the board is taken as the actual sensing distance is defective. If the position where the board is located is not at the closest distance within which the sensor can sense the board, the learnt distance is not the distance that the installer wants to set. Because there is no learning result reporting function, this situation is not known to the installer.

4. The sensed nearest distance is taken as the sensing distance, and there is no adjustment of the retraction distance. Thus, the critical sensing phenomenon occurs, and thus in actual use, it is prone to occur the phenomenon of abnormal liquid discharge.

Therefore, since the existing liquid dispenser lacks the function of interaction with the user during self-learning and lacks the ranging detection of the sensing distance after the self-learning, the liquid dispenser cannot provide the installer and the maintenance personnel with the intuitive judgment when the liquid dispenser is abnormal due to the long sensing distance. Thus, the difficulty of on-site testing and fault location for maintenance personnel is increased. Even the liquid dispenser needs to be replaced because the distance cannot be determined, and thus the maintenance cost is increased.

SUMMARY

Based on the above defects, it is necessary to provide a liquid dispenser sensing distance self-learning method, an electronic device, and a storage medium to solve the technical problem of the inconvenience of the sensing distance self-learning of the liquid dispenser.

An embodiment of the present disclosure provides a liquid dispenser sensing distance self-learning method.

The method comprises, in response to a self-learning request, entering a self-learning mode. The method also comprises in the self-learning mode, determining a nearest (e.g., shortest, closest) distance between a reference object and a sensing component, determining and storing a sensing distance based on the shortest distance, and identifying, by a first indication device, a state of the self-learning mode. The sensing distance is used by the liquid dispenser to dispense liquid when the liquid dispenser is in a working state and when a distance between the reference object and the sensing component is detected to be less than or equal to the sensing distance.

The method also comprises, in response to a sensing request (e.g., a ranging by sensing request or a ranging sensing request), entering a sensing mode (e.g., a ranging by sensing mode or a ranging sensing mode). The method also comprises, in the ranging by sensing mode, obtaining a detected distance between the reference object and the sensing component, comparing the detected distance with the sensing distance, and identifying, by a second indication device, a comparison result of the detected distance and the sensing distance.

In another embodiment of the present disclosure, the first indication device comprises a first light indication device. Identifying, by the first indication device, the state of the self-learning mode comprises:

- determining a current state of the self-learning mode and obtaining a first light effect corresponding to the current state; and
- controlling the first light indication device to display the first light effect.

In another embodiment of the present disclosure, the self-learning mode comprising an entering learning state, a learning state, a learning end success state, and a learning end failure state.

In another embodiment of the present disclosure, the second indication device comprises a second light indication device. Obtaining the detected distance between the reference object and the sensing component, comparing the detected distance with the sensing distance, and identifying, by the second indication device, the comparison result of the detected distance and the sensing distance comprises:

obtaining the detected distance between the reference object and the sensing component;

comparing the detected distance with the sensing distance and determining a second light effect corresponding to the comparison result based on the comparison result; and controlling the second light indication device to display the second light effect.

In another embodiment of the present disclosure, comparing the detected distance with the sensing distance and determining the second light effect corresponding to the comparison result based on the comparison result comprises:

comparing the detected distance with the sensing distance;

in response to a determination that the detected distance is greater than a sum of the sensing distance and a predetermined distance threshold, determining that the second light effect is an extinguished light effect or controlling the second light effect to be the extinguished light effect;

in response to a determination that the detected distance is less than or equal to the sum of the sensing distance and the predetermined distance threshold and greater than the sensing distance, determining that the corresponding second light effect is a flickering light effect or controlling the second light effect to be the flickering light effect; and in response to a determination that the detected distance is less than or equal to the sensing distance, determining that the corresponding second light effect is a constant on light effect or controlling the second light effect to be the constant on light effect.

In another embodiment of the present disclosure, in response to the determination that the detected distance is less than or equal to the sum of the sensing distance and the predetermined distance threshold and greater than the sensing distance, determining that the second light effect is the flickering light effect or controlling the second light effect to be the flickering light effect comprises:

in response to the determination that the detected distance is less than or equal to the sum of the sensing distance and the predetermined distance threshold and greater than the sensing distance, determining that the second light effect is the flickering light effect or controlling the second light effect to be the flickering light effect, and controlling a flickering speed of the flickering light effect corresponding to a smaller detected distance (e.g., a first detected distance) to be greater than or equal to a flickering speed of the flickering light effect corresponding to a larger detected distance (e.g., a second detected distance).

In another embodiment of the present disclosure, the method further comprises:

entering the self-learning mode in response to a self-learning instruction sent from a cloud.

In another embodiment of the present disclosure, determining the sensing distance based on the nearest distance comprises:

using a value of the nearest distance minus a predetermined retraction distance as the sensing distance.

The present disclosure provides an electronic device comprising:

at least one processor; and a memory communicatively connected to the at least one the processor; wherein the memory stores instructions executable by the at least one processor, the instructions are executed by the at least one processor to enable the at least one processor to perform the liquid dispenser sensing distance self-learning method as previously described.

The present disclosure provides a storage medium, the storage medium storing computer instructions for performing all steps of the liquid dispenser sensing distance self-learning method as previously described when a computer executes the computer instructions.

The present disclosure identifies the state of the self-learning mode by the first indication device, adds a ranging by sensing mode at the same time, and identifies a comparison result of a distance between the reference object and the sensing component and the sensing distance by a second indication device, so that the user can understand the state of the self-learning mode during a self-learning process of the liquid dispenser, and can judge the distance between the reference object and the sensing component by the ranging by sensing mode, so as to determine whether the setting of the sensing distance is correct, providing users and maintenance personnel with intuitive judgment for on-site testing and fault location, and reducing maintenance costs.

DETAILED DESCRIPTION

Figure 1:
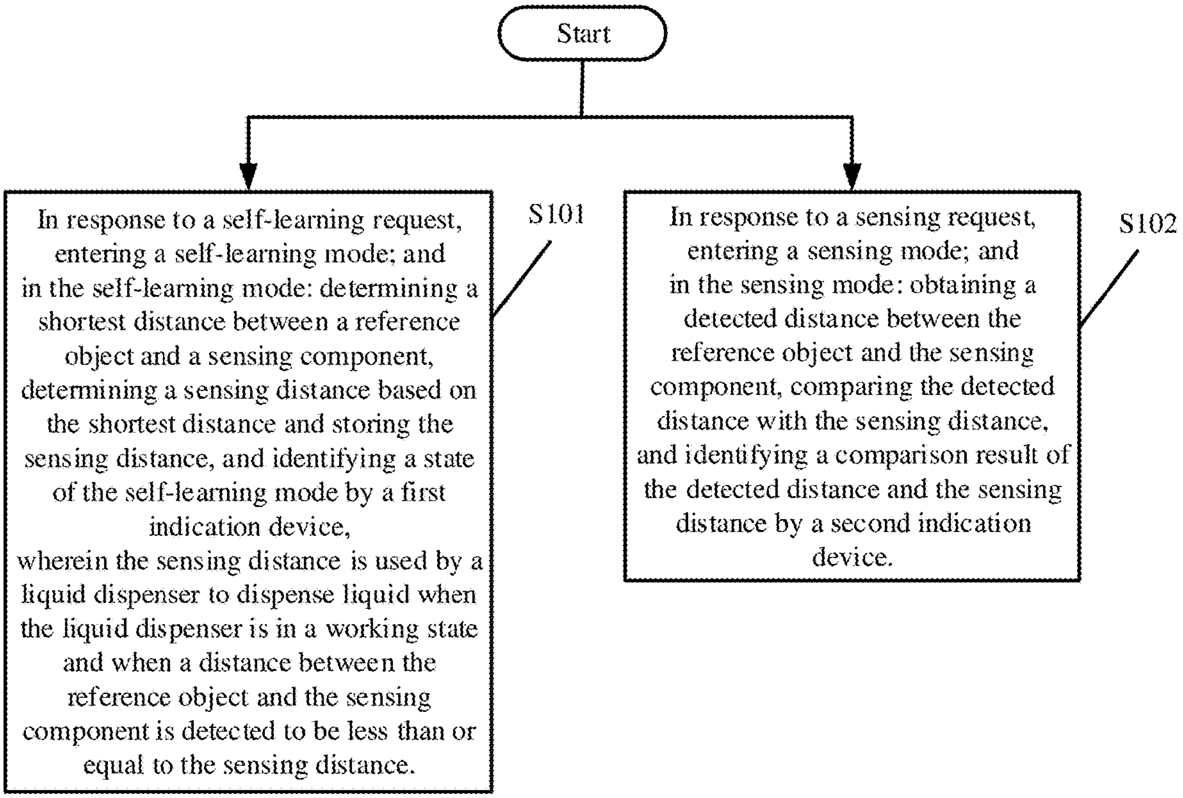
FIG. 1 is a workflow diagram of a liquid dispenser sensing distance self-learning method according to an example of the present disclosure.

The specific embodiments of the present disclosure are further described with reference to the drawings hereinafter. Same or equivalent components are denoted by same reference numerals. It should be noted that the terms “front”, “back”, “left”, “right”, “up” and “down” used in the following description refer to the directions in the drawings, and the terms “inner” and “outer” refer to the directions towards or far away from geometric centers of specific components respectively.

As shown in FIG. 1, a workflow diagram of a liquid dispenser sensing distance self-learning method according to an example of the present disclosure.

The method comprises, in step S101, in response to a self-learning request, entering a self-learning mode, and in the self-learning mode, determining a shortest (e.g., nearest, closest) distance between a reference object and a sensing component, determining and storing a sensing distance based on the shortest distance, and at the same time identifying, by a first indication device, a state of the self-learning mode. The sensing distance is used by the liquid dispenser to dispense liquid when the liquid dispenser is in a working state and when a distance between a reference object and a sensing component is detected to be less than or equal to the sensing distance.

The method further comprises, in step S102, in response to a sensing request (e.g., a ranging by sensing request or a ranging sensing request), entering a sensing mode (e.g., a ranging by sensing mode or a ranging sensing mode), and in the ranging by sensing mode, obtaining a detected distance between the reference object and the sensing component, comparing the detected distance with the sensing distance, and identifying, by a second indication device, a comparison result of the detected distance and the sensing distance.

Figure 2:
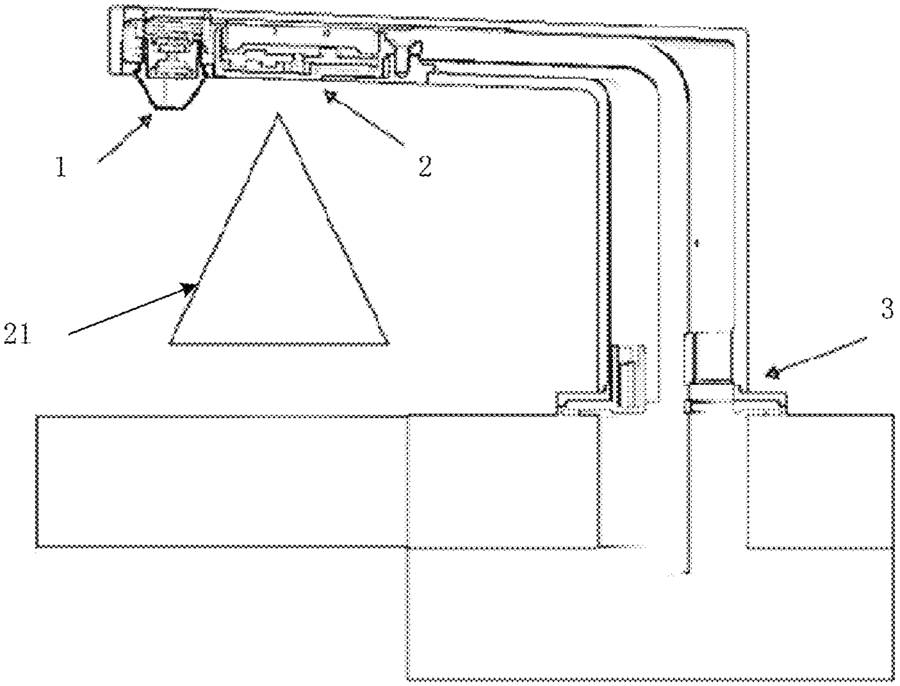
FIG. 2 is a structural schematic diagram of a liquid dispenser according to an example of the present disclosure.

Specifically, the present disclosure can be applied to a controller of the liquid dispenser. The liquid dispenser comprises, but is not limited to, a liquid dispensing device, such as soap dispenser, faucet and the like. FIG. 2 is a structural schematic diagram of a liquid dispenser according to an example of the present disclosure. As shown in FIG. 2, the liquid dispenser comprises a liquid dispensing element 1, a sensing component 2, and a countertop indicator light 3. The sensing component 2 may be a sensor, such as a distance sensor.

When the user requests the self-learning, step S101 is triggered. For example, if the user presses a self-learning button, or if the user presses the self-learning button for a long time, a self-learning request is generated and step S101 is triggered.

When step S101 is executed, the liquid dispenser enters the self-learning mode, detects the distance between the reference object and the sensing component 2, and uses a minimum value of all of the distances between the reference object and the sensing component 2 detected in the self-learning mode as the shortest distance between the reference object and the sensing component 2. The reference object may be an item detected by the sensing component 2, such as a board employed or used by the installer or the maintenance personnel on the scene, etc. The installer or maintenance personnel may adjust the distance between the board and the sensing component for self-learning of the liquid dispenser. The distance between the reference object and the sensing component 2 is the distance between the reference object and the sensing component 2 in a direction perpendicular to the sensing component 2. When the reference object is located within a detection range 21 of the sensing component 2, the sensing component 2 may obtain the distance between the reference object and the sensing component 2.

The self-learning mode has various states, comprising but not limited to a learning state, a learning end success state, and a learning end failure state. In the self-learning mode, the various states of the self-learning mode are identified by the first indication device to enable the user or on-site maintenance personnel to clearly identify the different states of the self-learning mode.

In an embodiment, the first indication device comprises a first light indication device. For example, the first indication device may be a sensor indicator light of the sensing component 2 and/or may be a countertop indicator light 3.

After the liquid dispenser exits the self-learning mode, the liquid dispensing element 1 of the liquid dispenser dispenses the liquid when the distance between the reference object and the sensing component is detected to be less than or equal to the sensing distance.

Step S102 is triggered when the user requests a ranging by sensing. For example, if the user presses a ranging by sensing button, or if the user presses the self-learning button momently (e.g., shorter than a predetermined time period, hereinafter "short-presses" the self-learning button), the ranging by sensing request is generated, and step S102 is triggered.

In the ranging by sensing mode, the detected distance between the reference object and the sensing component is obtained and compared with the sensing distance, and the comparison result of the detected distance and the sensing distance is identified by the second indication device.

In an embodiment, the second indication device may be a second light indication device.

For example, the second indication device may be a sensor indicator light of the sensing component 2 and/or may be a countertop indicator light 3.

Because the counter basin, which the liquid dispenser needs to be matched with, tends to be more complicated, when the liquid dispenser performs self-learning, the user or maintenance personnel provides a reference object, such as a board, for the liquid dispenser to perform self-learning to determine the sensing distance. However, due to the complexity of the counter basin, there may be some protruding items and other items likely to be placed next to the liquid dispenser. Therefore, these items are likely to cause interference during the self-learning process of the liquid dispenser. Thus, the sensing distance learned by the liquid dispenser is too small.

Therefore, by providing a ranging by sensing mode, the user, the installer, or the maintenance personnel can place a reference object, such as a board, at the corresponding position of the sensing element, can determine the detected distance between the reference object and the sensing component, and can identify the comparison result of the detected distance and the sensing distance by the second indication device. The user, the installer or the maintenance personnel can determine whether the sensing distance is correctly set based on the actual distance between the reference object and the sensing element. For example, when the reference object is placed at the sensing distance considered by the user, the installer, or the maintenance personnel, if the second indication device indicates that the detected distance is inconsistent with the sensing distance, the sensing distance may be considered to be set incorrectly. If the second indication device indicates that the detected distance is consistent with the sensing distance, the sensing distance is considered to be set correctly.

The present disclosure identifies the state of self-learning mode through the first indication device, adds the ranging by sensing mode at the same time, and identifies the comparison result of the distance between the reference object and the sensing component and the sensing distance through the second indication device. Thus, the user can understand the state of self-learning mode during the self-learning process of the liquid dispenser and can judge (e.g., determine) the distance between the reference object and the sensing component through the ranging by sensing mode, so as to determine whether the setting of the sensing distance is correct and so as to provide intuitive judgment for the user and the maintenance personnel for on-site testing and fault location. Thus, the maintenance costs may be reduced.

Figure 3:
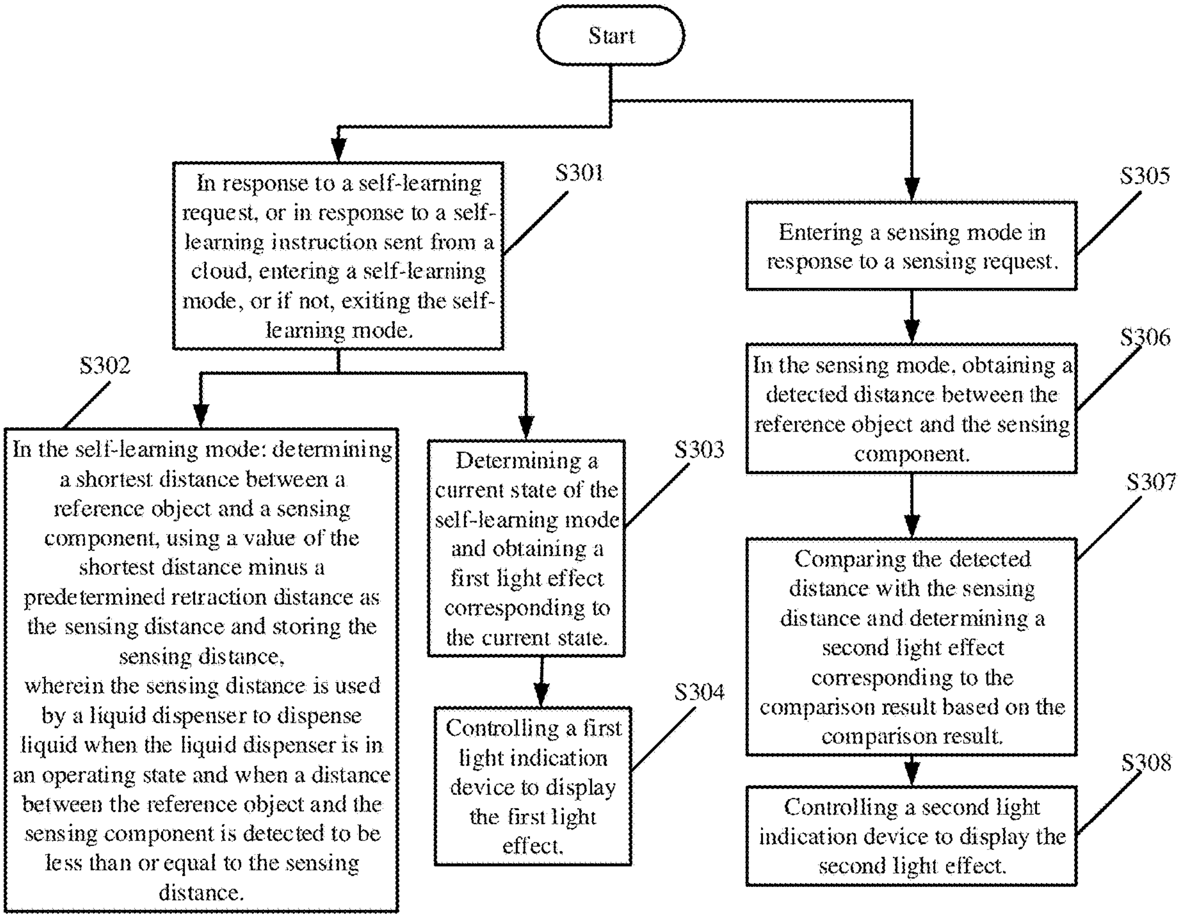
FIG. 3 is a workflow diagram of a liquid dispenser sensing distance self-learning method according to another example of the present disclosure.

A workflow diagram of a liquid dispenser sensing distance self-learning method according to another example of the present disclosure is shown in FIG. 3.

The method comprises, in step S301, in response to a self-learning request, or in response to a self-learning instruction sent from the cloud, entering a self-learning mode, or if not, exiting the self-learning mode.

The method further comprises, in step S302, in the self-learning mode, determining a shortest distance between a reference object and a sensing component, using a value of the shortest distance minus a predetermined retraction distance as the sensing distance and storing the sensing distance. The sensing distance is used by the liquid dispenser to dispense the liquid when the liquid dispenser is in an operating state (e.g., a working state) and when the distance between the reference object and the sensing component is detected to be less than or equal to the sensing distance.

The method further comprises, in step S303, determining a current state of the self-learning mode and obtaining a first light effect corresponding to the current state.

In an embodiment, the self-learning mode comprises an entering learning state, a learning state, a learning end success state, and a learning end failure state.

Specifically, a table showing how the self-learning mode corresponds to the first light effect may be stored in advance. When the current state of the self-learning mode is determined, the first light effect corresponding to the current state is obtained or referenced in the table.

The method further comprises, in step S304, controlling a first light indication device to display the first light effect.

The method further comprises, in step S305, entering the ranging by sensing mode in response to a ranging by sensing request.

The method further comprises, in step S306, in the ranging by sensing mode, obtaining the detected distance between the reference object and the sensing component.

The method further comprises, in step S307, comparing the detected distance with the sensing distance and determining a second light effect corresponding to the comparison result based on the comparison result.

In an embodiment, comparing the detected distance with the sensing distance and, and determining a second light effect corresponding to the comparison result based on the comparison result, specifically comprises:

- comparing the detected distance with the sensing distance;
- in response to a determination that the detected distance is greater than a sum of the sensing distance and a predetermined distance threshold, determining that the corresponding second light effect is an extinguished light effect or controlling the corresponding second light effect to be the extinguished light effect;
- in response to a determination that the detected distance is less than or equal to the sum of the sensing distance and the predetermined distance threshold and greater than the sensing distance, determining that the corresponding second light effect is a flickering light effect or controlling the second light effect to be the flickering light effect; and
- in response to a determination that the detected distance is less than or equal to the sensing distance, determining that the corresponding second light effect is a constant on light effect or controlling the second light effect to be the constant on light effect.

In an embodiment, in response to the determination that the detected distance is less than or equal to the sum of the sensing distance and the predetermined distance threshold and greater than the sensing distance, determining that the corresponding second light effect is a flickering light effect or controlling the second light effect to be the flickering light effect specifically comprises:

- in response to the determination that the detected distance is less than or equal to the sum of the sensing distance and the predetermined distance threshold and greater than the sensing distance, determining that the corresponding second light effect is a flickering light effect or controlling the second light effect to be the flickering light effect, and controlling a flickering speed of the flickering light effect corresponding to a smaller detected distance to be greater than or equal to a flickering speed of the flickering light effect corresponding to a larger detected distance.

The method further comprises, in step S308, controlling a second light indication device to display the second light effect.

Specifically, this embodiment adds the self-learning function and the ranging by sensing function to the ordinary liquid dispenser. The self-learning button and indication device are added on the liquid dispenser. The liquid dispenser may be a soap dispenser. The sensing device may be a light-emitting diode (LED) light.

The liquid dispenser self-learning function of this embodiment may be linked to a cell phone application (APP) and a cloud, which can provide assistance when the user is unable to operate the self-learning button and can also provide diagnostic services when the liquid dispenser works abnormally. When the user, the installer, or the maintenance personnel presses the self-learning button for a long time (e.g., equal to or longer than a predetermined time period, hereinafter "long-presses" the self-learning button) or clicks the self-learning button of the APP, step S301 is triggered. Alternatively, when the administrator turns on the self-learning function of the liquid dispenser through the cloud, the self-learning instruction is sent to the liquid dispenser, and thus step S301 is triggered. The cloud may be a cloud server. The cloud can record the unique identifier (ID) of the liquid dispenser and bind or link the unique ID of the liquid dispenser to a liquid dispenser network identifier, such as an IP address. The cloud can send the self-learning instructions to the liquid dispenser by selecting the unique ID of the liquid dispenser through the associated or linked liquid dispenser network identifier.

In an embodiment, after the liquid dispenser has finished self-learning, the learning result comprising the sensing distance is reported to the cloud to realize remote help and diagnosis, which brings great convenience to the user.

Meanwhile, since self-learning can be started only when the administrator sends the permission for self-learning information through the cloud, the permission to start self-learning is owned by the administrator in the cloud. Thus, the trouble caused by users mistakenly triggering the self-learning function is greatly reduced when using the self-learning button or APP.

In the self-learning mode, step S302 and step S303 may be executed simultaneously. When step S302 is executed, the closest distance between the reference object and the sensing component is determined, and the value of the closest distance minus the predetermined retraction distance is used as the sensing distance and stored. The retraction distance is a pre-set distance. When the self-learning is performed, there are likely to be unnoticed obstacles in the surrounding environment. If these obstacles are disposed between the reference object and the sensing component, the closest distance obtained by self-learning is probably not the closest distance between the reference object and the sensing component, but actually the closest distance between the unnoticed obstacles and the sensing component. Therefore, if the shortest distance is directly used as the sensing distance, the obstacle may repeatedly trigger the sensing component due to a certain error in the sensing distance of the sensing component, resulting in the critical sensing phenomenon.

In this embodiment, the retraction distance is subtracted from the shortest distance, and the sensing distance error is offset by the retraction distance, so as to avoid the above-mentioned critical sensing phenomenon.

After the liquid dispenser enters the self-learning mode, step S303 and step S304 control the first light indication device to display the current state of the self-learning mode.

The self-learning mode comprises the learning state, the learning end success state, and the learning end failure state. As an example, the liquid dispenser may be a soap dispenser. The first light indication device may be a countertop indicator light 3 and a sensor indicator light of the sensing element 2 as shown in FIG. 2, and the countertop indicator light 3 and the sensor indicator light of the sensing element 2 each have a red light and a blue light.

TABLE 1

Correspondence table of light and each state of self-learning mode

| Soap dispenser mode | States | Sensor indicator light | Countertop indicator light | Trigger method to enter this state |
|---|---|---|---|---|
| Self-learning mode | Entering learning state | Red light is on for a time period t1. | Red light is on for a time period t1. | Long-press the self-learning button |
| | Learning state | Red light flickers until the end of learning. | Red light flickers until the end of learning. | |
| | Learning end success state | Red light is off. | Blue light is on for the time period t1. | The reference object is found outside the predetermined distance during the self-learning process. |
| | Learning end failure state | Red light is on for a long time (e.g., longer than a predetermined time period) and the sensing function is off. | Red light is on for a long time (e.g., longer than a predetermined time period). | The reference object is found within the predetermined distance during the self-learning process. |

Table 1 shows various first light effects. When the red light is lit for a time t1, this first light effect indicates that the learning mode is entered, and the current state is the entering learning state. In the learning process, i.e., in the learning state (e.g., an ongoing learning state), the red light rapidly flickers twice per second, and this first light effect indicates it is learning. When the self-learning is over, if the learning is successful, i.e., in the learning end success state, the blue light of the countertop indicator light 3 on the liquid dispenser lights up for the time t1, and the light on the sensing component 2 is turned off automatically. If the learning fails, i.e., in the learning end failure state, the red light of the countertop indicator light 3 on the liquid dispenser lights up for a long time, the light on the sensing component 2 lights up for a long time, and the sensing function is turned off. Simultaneously, the liquid dispenser reports the learning results to the cloud.

Figure 4:
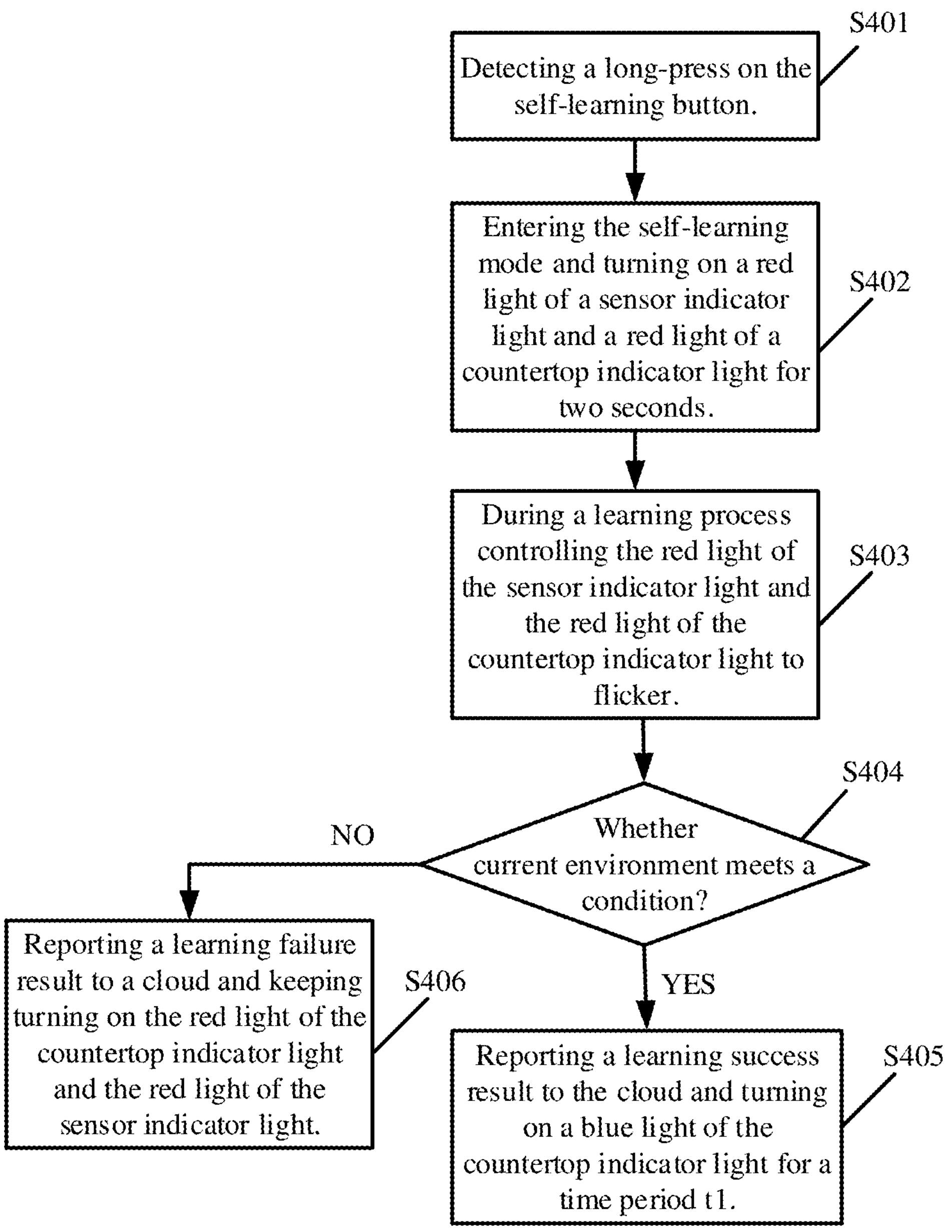
FIG. 4 is a self-learning mode workflow diagram of a liquid dispenser sensing distance self-learning method according to the example of the present disclosure.

As shown in FIG. 4, a self-learning mode workflow diagram of a liquid dispenser sensing distance self-learning method according to the example of the present disclosure.

The method comprises, in step S401, detecting a long-press on the self-learning button.

The method further comprises, in step S402, entering the self-learning mode and turning on the red light of the sensor indicator light for t1 (e.g., two seconds) and the red light of the countertop indicator light 3 for t1 (e.g., two seconds).

The method further comprises, in step S403, during the learning process, controlling the red light of the sensor indicator light and the red light of the countertop indicator light 3 to flicker.

The method further comprises, in step S404, determining whether the current environment meets the condition, and if so, executing step S405, otherwise executing step S406.

The method further comprises, in step S405, reporting the learning success result to the cloud, and turning on the blue light of the countertop indicator light 3 for a time period t1.

The method further comprises, in step S406, reporting the learning failure result to the cloud, keeping turning on the red light of the countertop indicator light 3 and the red light of the sensor indicator light.

When the user, the installer, or the maintenance personnel momently presses the self-learning button (e.g., shorter than a predetermined time period, hereinafter "short-presses" the self-learning button) to trigger step S305, the liquid dispenser enters the ranging by sensing mode. At this time, the blue light of the countertop indicator light 3 of the liquid dispenser flickers once and the light on the sensing component 2 flickers once to indicate that liquid dispenser enters the ranging by sensing mode. At this time, step S306 is executed to obtain the detected distance between the reference object and the sensing component. Step S307 and step S308 are executed to compare the detected distance with the sensing distance and control the second light indication device to display the corresponding second light effect according to the comparison result.

In an embodiment, the second light indication device may comprise a blue light of the countertop indicator light 3 of the liquid dispenser and a sensor indicator light of the sensing element 2. The flickering patterns of the countertop indicator light 3 of the liquid dispenser and the sensor indicator light of the sensing element 2 give different indications based on the position of the reference object at the distance from the sensing component, as shown in Table 2.

TABLE 2

Correspondence table of light and detected distance of reference object

| Soap dispenser mode | States | Sensor indicator light | Countertop indicator light | Trigger method for entering this state |
|---|---|---|---|---|
| Ranging by sensing mode | Enter the sensing distance measurement mode | Red light flickers once. | Blue light flickers once. | Short-press the self-learning button once |
| | The reference | Red light is | Blue light is | |

TABLE 2-continued

Correspondence table of light and detected distance of reference object

| Soap dispenser mode | States | Sensor indicator light | Countertop indicator light | Trigger method for entering this state |
|---|---|---|---|---|
| | object is disposed within the effective sensing area. | on for a long time (e.g., longer than a predetermined time period). | on for a long time (e.g., longer than a predetermined time period). | |
| | The reference object is disposed within the effective sensing area + predetermined first distance threshold. | Red light flickers at a first frequency. | Blue light flickers at a first frequency. | |
| | The reference object is disposed within the effective sensing area + predetermined second distance threshold. | Red light flickers at a second frequency. | Blue light flickers at a second frequency. | |
| | The reference object is outside the effective sensing area + predetermined second distance threshold. | Red light stays off. | Blue light stays off. | |
| Exit the ranging by sensing mode and enter the normal working mode | | Red light is on for a time period t2. | Red light is on for a time period t2. | The ranging by sensing test time is T. If T is exceeded, the ranging by sensing mode is automatically exited, or if a short-press of sthe elf-learning button is detected once again within T, the ranging by sensing mode is directly exited |

As shown in Table 2, the effective sensing area is the area between the sensing distance and the sensing element. The first frequency is greater than the second frequency. The first distance threshold is less than the second distance threshold. If the reference object is disposed outside the effective sensing area plus the second distance threshold, the blue light of the countertop indicator light 3 is extinguished. If the reference object is disposed within the effective sensing area plus the second distance threshold, the blue light of the countertop indicator light 3 flickers, and the closer the sensing component is, the faster the blue light of the countertop indicator light 3 flickers. Once the reference object enters the effective sensing area, the blue light of the countertop indicator light 3 stays on. Through different light effects and different flickering frequency, the users and the installers can easily determine the current sensing area and can easily determine whether the current installation location is appropriate.

The countertop indicator light 3 is located in a portion of the liquid dispenser near the countertop, and thus the light may allow the user to easily determine the current state.

Figure 5:
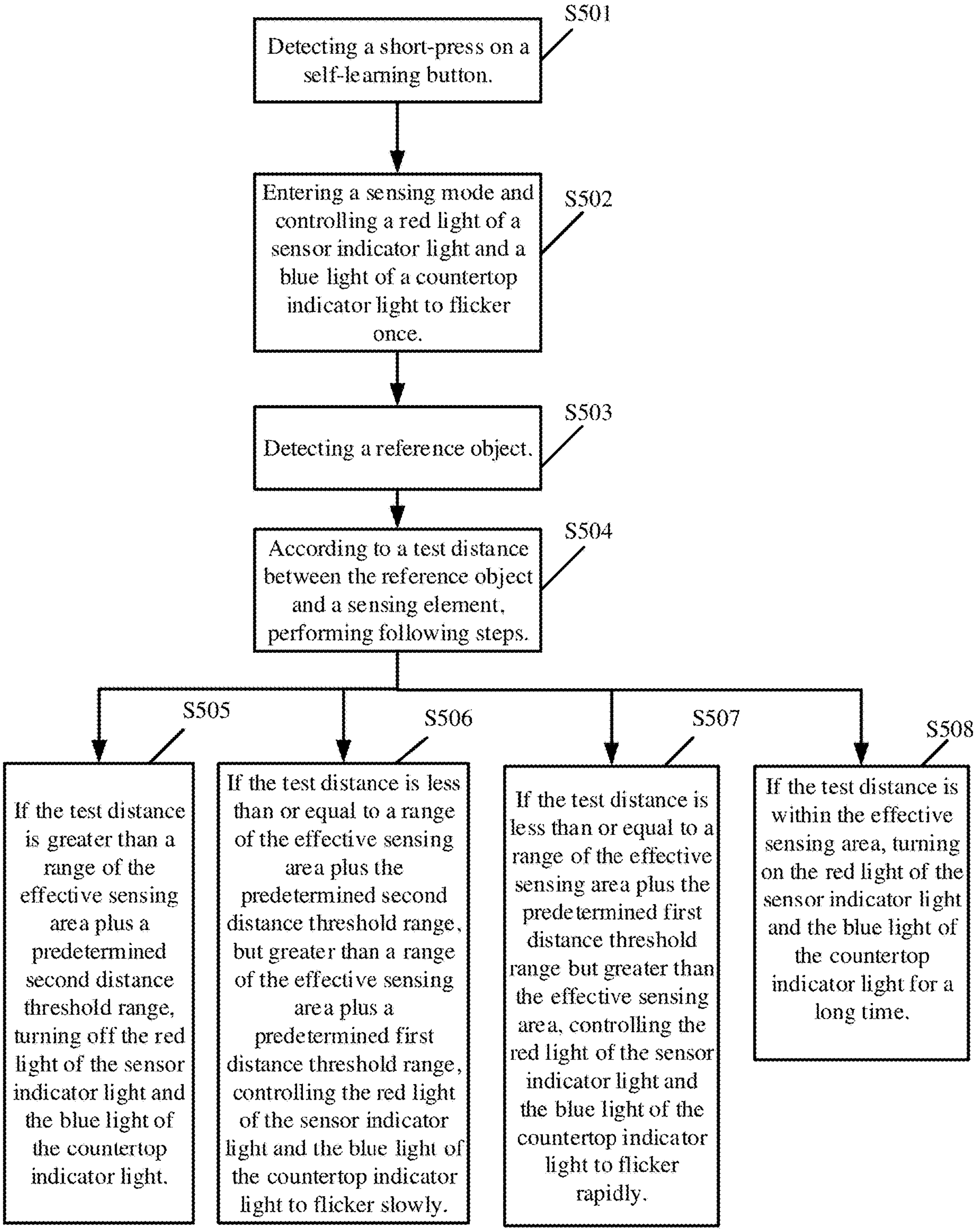
FIG. 5 is a ranging by sensing mode workflow diagram of a liquid dispenser sensing distance self-learning method according to the example of the present disclosure.

As shown in FIG. 5, a ranging by sensing mode workflow diagram of a liquid dispenser sensing distance self-learning method according to the example of the present disclosure.

The method comprises, in step S501, detecting a short-press on the self-learning button.

The method further comprises, in step S502, entering the ranging by sensing mode and controlling the red light of the sensor indicator light and the blue light of the countertop indicator light 3 to flicker once.

The method further comprises, in step S503, detecting a reference object.

The method further comprises, in step S504, according to the test distance between the reference object and the sensing element 2, performing the following steps.

The method further comprises, in step S505, if the test distance is greater than a range of the effective sensing area plus the predetermined second distance threshold, turning off the red light of the sensor indicator light and the blue light of the countertop indicator light 3.

The method further comprises, in step S506, if the test distance is less than or equal to the range of the effective sensing area plus the predetermined second distance threshold, but greater than a range of the effective sensing area plus the predetermined first distance threshold range, controlling the red light of the sensor indicator light and the blue light of the countertop indicator light 3 to flicker slowly.

The method further comprises, in step S507, if the test distance is less than or equal to the range of the effective sensing area plus the predetermined first distance threshold but greater than the effective sensing area, controlling the red light of the sensor indicator light and the blue light of the countertop indicator light 3 to flicker rapidly.

The method further comprises, in step S508, if the test distance is within the effective sensing area, turning on the red light of the sensor indicator light and the blue light of the countertop indicator light 3 for a long time (e.g., longer than a predetermined time period).

This embodiment adds the self-learning mode and the sensing test mode to interact with customers during the installation and use of the liquid dispenser, and thus plays a better customer care role. This embodiment adds self-learning function to the liquid dispenser, which can automatically adjust the sensing distance of the liquid dispenser according to the different on-site environments. This embodiment introduces the concept of retraction distance to avoid the phenomenon of critical sensing and gives the result of successful or unsuccessful learning while reporting the sensing distance value after learning. Thus. the on-site installers and maintenance personnel get more intuitive and accurate data. Meanwhile, the ranging by sensing mode provides convenience for on-site testing. As the reference object gets closer to the sense, the light of the indicator light flickers more frequently. The light stays on when the reference object enters the sensing distance. This provides convenience to the installers and the maintenance personnels on site while also providing vivid reminders and instructions.

Figure 6:
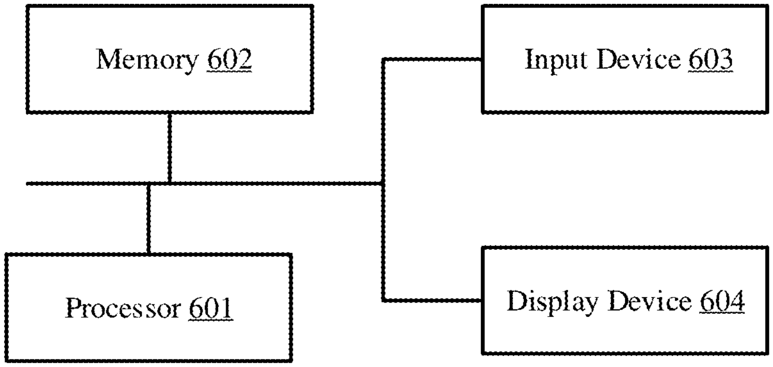
FIG. 6 is a schematic diagram of the hardware structure of an electronic device according to an example of the present disclosure.

As shown in FIG. 6, a schematic diagram of the hardware structure of an electronic device according to an example the present disclosure.

- at least one processor 601; and
- a memory 602 communicably connected to the at least one processor 601.

The memory 602 stores an instruction executable by the at least one processor 601, the instruction is executed by the at least one processor to enable the at least one processor to perform the sensing distance self-learning method for liquid dispenser as previously described.

An example of a processor 601 is shown in FIG. 6. The processor may be included in a controller in the present disclosure, which can be implemented by any appliances or by any software or applications run by the appliances. The controller may be connected to a workstation or another external device (e.g., control panel, remote) and/or a database for receiving user inputs, system characteristics, and any of the values described herein. Optionally, the controller may include an input device and/or a sensing circuit in communication with any of the sensors. The sensing circuit receives sensor measurements from as described above. Optionally, the controller may include a drive unit for receiving and reading non-transitory computer media having instructions. Additional, different, or fewer components may be included. The processor is configured to perform instructions stored in memory for executing the algorithms described herein.

The processor 601 may be a general purpose or specific purpose processor, an application specific integrated circuit (ASIC), one or more programmable logic controllers (PLCs), one or more field programmable gate arrays (FPGAs), a group of processing components, or other suitable processing components. Processor is configured to execute computer code or instructions stored in memory or received from other computer readable media (e.g., embedded flash memory, local hard disk storage, local ROM, network storage, a remote server, etc.). The processor may be a single device or combinations of devices, such as associated with a network, distributed processing, or cloud computing.

The electronic device may also comprise an input device 603 and a display device 604.

The processor 601, the memory 602, the input device 603, and the display device 604 may be connected via a bus or other means, and the connection via the bus is shown as an example.

The memory 602, as a non-volatile computer readable storage medium, can be used to store non-volatile software programs, non-volatile computer executable programs, and modules, such as the program instructions/modules corresponding to the liquid dispenser sensing distance self-learning method in this embodiment, for example, the method flow shown in FIG. 1. The processor 601 executes various functional applications and data processing by running the non-volatile software programs, instructions, and modules stored in the memory 602, to implement the liquid dispenser sensing distance self-learning method in the above embodiment.

The memory 602 may comprises a stored program area and a stored data area. The stored program area may store the operating system and at least one application program required by function. The stored data area may store data created based on the use of the liquid dispenser sensing distance self-learning method, etc. In addition, the memory 602 may comprises high-speed random-access memory and may also comprises non-volatile memory, such as at least one disk memory device, flash memory device, or other non-volatile solid state memory device. In some embodiments, the memory 602 optionally comprises memory that is remotely located relative to processor 601, and these remote memories may be connected via a network to a device that performs a liquid dispenser sensing distance self-learning method. Examples of the networks comprises, but are not limited to, the Internet, corporate intranets, local area networks, mobile communication networks, and combinations thereof.

The input device 603 may receive input user clicks and may generate a signal input of related to user settings as well as function control of the liquid dispenser sensing distance self-learning method. The display device 604 may comprises a display, such as a display screen.

The one or more modules stored in the memory 602, when run by the one or more processors 601, execute the liquid dispenser sensing distance self-learning method of any of the embodiments described above.

The present disclosure identifies the state of self-learning mode through the first indication device, adds the ranging by sensing mode, and identifies the comparison result of the distance between the reference object and the sensing component and the sensing distance through the second indication device. Thus, the user can understand the state of self-learning mode during the self-learning process of the liquid dispenser and can determine the distance between the reference object and the sensing component through the ranging by sensing mode, so as to determine whether the setting of the sensing distance is correct and provide intuitive judgment for the user and maintenance personnel for on-site testing and fault location. Thus, maintenance costs may be reduced.

One embodiment of the present disclosure provides a storage medium. The storage medium stores computer instructions for performing all steps of the liquid dispenser sensing distance self-learning method as previously described when a computer executes the computer instructions.

Figure 7:
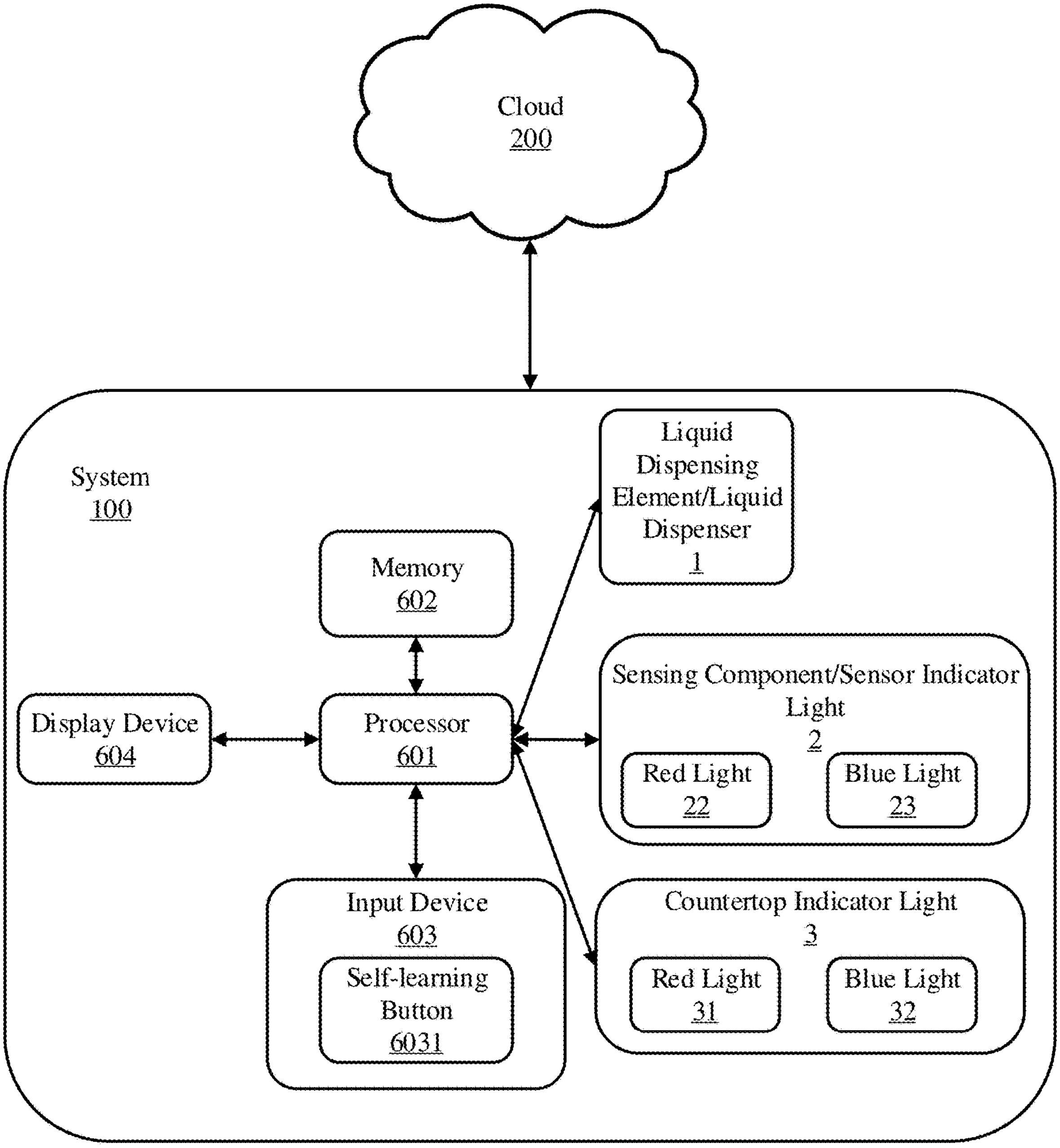
FIG. 7 is a schematic diagram of a liquid dispenser sensing distance self-learning system according to an example of the present disclosure.

FIG. 7 is a schematic diagram of a liquid dispenser sensing distance self-learning system according to an example of the present disclosure. The liquid dispenser sensing distance self-learning system may perform the method, operation, function, or the like according to any of the foregoing examples and may comprise the structure according to any of the foregoing examples.

Specifically, a liquid dispenser sensing distance self-learning system 100 comprises a processor 601 and a memory 602, an input device 603, a display device 604, a liquid dispensing element 1, a sensing component 2, and a countertop indicator light 3, each communicably connected to the processor 601.

The processor 601 may perform the methods as described above with reference to FIGS. 1 and 3-5 and may comprise the structure as described above.

The memory 602 may store the computer instructions for performing all steps of the liquid dispenser sensing distance self-learning method and may store data as previously described. For example, the memory 602 may store the sensing distance, Table 1, Table 2, the first light effects, the second light effects, the predetermined time period, the predetermined first distance threshold, the predetermined second distance threshold, and the predetermined retraction distance, etc. as described above.

The input device 603 may comprise a self-learning button 6031 configured to trigger the self-learning mode and the sensing mode as described above.

The display device 604 may comprise a display, such as a display screen.

The liquid dispensing element 1 may be controlled by the processor 601 to dispense the liquid. For example, the processor 601 may control the liquid dispensing element 1 or the liquid dispenser to dispense the liquid when the distance between the reference object and the sensing component is detected to be less than or equal to the sensing distance.

The sensing component 2 comprises a sensor indicator light, including a first light (e.g., a red light 22) and a second light (e.g., a blue light 23). The processor 601 may control the red light 22 and the blue light 23 to turn on, turn off, or flicker as described above.

The countertop indicator light 3 comprises a third light (e.g., a red light 31) and a fourth light (e.g., a blue light 32). The processor 601 may control the red light 31 and the blue light 32 to turn on, turn off, or flicker as described above.

The liquid dispenser sensing distance self-learning system may be communicably connected to a cloud 200. The cloud 200 may be the cloud as described above. For example, the cloud may be a cloud server. The cloud 200 can record the unique identifier (ID) of the liquid dispenser and bind or link the unique ID of the liquid dispenser to a liquid dispenser network identifier, such as an IP address. The cloud 200 can send the self-learning instructions to the liquid dispenser by selecting the unique ID of the liquid dispenser through the associated or linked liquid dispenser network identifier. The learning result comprising the sensing distance may be reported to the cloud 200 to realize remote help and diagnosis. The liquid dispenser reports the learning results to the cloud 200.

The above-described embodiments only express several embodiments of the present disclosure, and their descriptions are more specific and detailed, but the embodiments should not be understood as a limitation of the patent scope of the present disclosure. It should be pointed out that, for those of ordinary skill in the art, other modifications and improvements may be made on the basis of the principle of the present disclosure, which should also be regarded as falling in the protection scope of the present disclosure. Therefore, the scope of protection the present invention shall be subject to the appended claims.

We claim:

1. A liquid dispenser sensing distance self-learning method, comprising:

- in response to a self-learning request, entering a self-learning mode;
- in the self-learning mode, determining a shortest distance between a reference object and a sensing component;
- in the self-learning mode, determining and storing a sensing distance based on the shortest distance, wherein a liquid dispenser dispenses liquid when the liquid dispenser is in a working state and when a distance between the reference object and the sensing component is detected to be less than or equal to the sensing distance;
- in the self-learning mode, identifying, by a first indication device, a state of the self-learning mode;
- in response to a sensing request, entering a sensing mode;
- in the sensing mode, detecting the distance between the reference object and the sensing component;
- in the sensing mode, comparing the detected distance with the sensing distance; and
- in the sensing mode, identifying, by a second indication device, a comparison result of the detected distance and the sensing distance.

2. The liquid dispenser sensing distance self-learning method according to claim 1, wherein the first indication device comprises a first light indication device, and

- wherein identifying, by the first indication device, the state of the self-learning mode comprises:
  - determining a current state of the self-learning mode and obtaining a first light effect, among a plurality of first light effects, corresponding to the current state; and
  - controlling the first light indication device to display the first light effect.

3. The liquid dispenser sensing distance self-learning method according to claim 2, wherein the self-learning mode comprising an entering learning state, a learning state, a learning end success state, and a learning end failure state.

4. The liquid dispenser sensing distance self-learning method according to claim 2, further comprising:

- in the self-learning mode, generating a table linking each of the plurality of first light effects and a corresponding state of the self-learning mode.

5. The liquid dispenser sensing distance self-learning method according to claim 1, wherein the second indication device comprises a second light indication device, and

- wherein identifying, by the second indication device, the comparison result of the detected distance and the sensing distance comprises:
  - determining a second light effect, among a plurality of second light effects, corresponding to the comparison result based on the comparison result; and
  - controlling the second light indication device to display the second light effect.

6. The liquid dispenser sensing distance self-learning method according to claim 5, wherein determining the second light effect corresponding to the comparison result based on the comparison result comprises:

- in response to a determination that the detected distance is greater than a sum of the sensing distance and a predetermined distance threshold, controlling the second light effect to be an extinguished light effect;
- in response to a determination that the detected distance is less than or equal to the sum of the sensing distance and the predetermined distance threshold and greater than the sensing distance, controlling the second light effect to be a flickering light effect; and in response to a determination that the detected distance is less than or equal to the sensing distance, controlling the second light effect to be a constant on light effect.

7. The liquid dispenser sensing distance self-learning method according to claim 6, wherein in response to the determination that the detected distance is less than or equal to the sum of the sensing distance and the predetermined distance threshold and greater than the sensing distance, controlling the second light effect to be the flickering light effect comprises:

controlling a flickering speed of the flickering light effect corresponding to a first detected distance to be greater than or equal to a flickering speed of the flickering light effect corresponding to a second detected distance, the first detected distance being smaller than the second detected distance.

8. The liquid dispenser sensing distance self-learning method according to claim 5, further comprising:

in the sensing mode, generating a table linking each of the plurality of second light effects and a corresponding comparison result of the detected distance and the sensing distance.

9. The liquid dispenser sensing distance self-learning method according to claim 1, further comprising entering the self-learning mode in response to a self-learning instruction sent from a cloud.

10. The liquid dispenser sensing distance self-learning method according to claim 1, wherein determining the sensing distance based on the shortest distance comprises:

using a value of the shortest distance minus a predetermined retraction distance as the sensing distance.

11. The liquid dispenser sensing distance self-learning method according to claim 1, wherein detecting the distance between the reference object and the sensing component comprising:

obtaining a distance between the reference object and the sensing component in a direction perpendicular to the sensing component when the reference object is disposed within a detection range of the sensing component.

12. The liquid dispenser sensing distance self-learning method according to claim 1, further comprising:

linking, by a server, an identifier of the liquid dispenser to a liquid dispenser network identifier;

sending, by the server, self-learning instructions to the liquid dispenser by selecting the identifier of the liquid dispenser through the linked liquid dispenser network identifier; and reporting the sensing distance and the state of the self-learning mode to the server.

13. An liquid dispenser sensing distance self-learning system, comprising:

at least one processor configured to enter a self-learning mode in response to a self-learning request and enter a sensing mode in response to a sensing request;

a sensor indicator light communicably connected to the at least one processor configured to display a first light effect, among a plurality of first light effects, in the self-learning mode and configured to display a first light effect, among a plurality of first light effects, in the self-learning mode; and a countertop indicator light communicably connected to the at least one processor configured to display a first light effect, among a plurality of first light effects, in the self-learning mode and configured to display a second light effect, among a plurality of second light effects, in the sensing mode.

14. The liquid dispenser sensing distance self-learning system according to claim 13, further comprising:

an input device configured to be pressed by a user to generate the self-learning request or the sensing request.

15. The liquid dispenser sensing distance self-learning system according to claim 14, wherein the self-learning request is generated in response to a long-press on the input device, wherein the sensing request is generated in response to a short-press on the input device, and wherein the long-press is a press equal to or longer than a predetermined time period, and the short-press is a press shorter than the predetermined time period.

16. The liquid dispenser sensing distance self-learning system according to claim 13, wherein the sensor indicator light comprises a first light and a second light, and the countertop indicator light comprises a third light and a fourth light.

17. The liquid dispenser sensing distance self-learning system according to claim 16, wherein the processor is further configured to, in the self-learning mode:

turn on the first light and the third light for a first predetermined time period to indicate an entering learning state;

control the first light and the third light to flicker to indicate an ongoing learning state;

turn off the first light and turn on the fourth light to indicate a learning end success state; and turn on the first light and the third light for a second predetermined time period to indicate a learning end failure state.

18. The liquid dispenser sensing distance self-learning system according to claim 16, wherein the processor is further configured to, in the sensing mode:

control the first light and the fourth light to flicker once to indicate that the sensing mode is entered;

turn on the first light and the fourth light for a first predetermined time period in response to a determination that a reference object is disposed within an effective sensing area;

control the first light and the fourth light to flicker at a first frequency in response to a determination that the reference object is disposed within the effective sensing area plus a predetermined first distance threshold;

control the first light and the fourth light to flicker at a second frequency in response to a determination that the reference object is disposed within the effective sensing area plus a predetermined second distance threshold;

turning off the first light and the fourth light in response to a determination that the reference object is disposed outside the effective sensing area plus a predetermined second distance threshold; and turn on the first light and the third light for a second predetermined time period to indicate that the sensing mode ends.

19. A non-transitory storage medium, storing computer instructions for performing a liquid dispenser sensing distance self-learning method, the method comprising:

in response to a self-learning request, entering a self-learning mode;

in the self-learning mode, determining a shortest distance between a reference object and a sensing component;

in the self-learning mode, determining and storing a sensing distance based on the shortest distance, wherein a liquid dispenser dispenses liquid when the liquid dispenser is in a working state and when a distance between the reference object and the sensing component is detected to be less than or equal to the sensing distance;

in the self-learning mode, identifying, by a first indication device, a state of the self-learning mode;

in response to a sensing request, entering a sensing mode;

in the sensing mode, detecting the distance between the reference object and the sensing component;

in the sensing mode, comparing the detected distance with the sensing distance; and in the sensing mode, identifying, by a second indication device, a comparison result of the detected distance and the sensing distance.

20. The non-transitory storage medium according to claim 19, wherein the first indication device comprises a first light indication device, wherein identifying, by the first indication device, the state of the self-learning mode comprises:

determining a current state of the self-learning mode and obtaining a first light effect, among a plurality of first light effects, corresponding to the current state; and controlling the first light indication device to display the first light effect, wherein the second indication device comprises a second light indication device, and wherein identifying, by the second indication device, the comparison result of the detected distance and the sensing distance comprises:

determining a second light effect, among a plurality of second light effects, corresponding to the comparison result based on the comparison result; and controlling the second light indication device to display the second light effect.

* * * * *